United States Patent [19]
Hwang

[11] Patent Number: 5,883,733
[45] Date of Patent: Mar. 16, 1999

[54] APPARATUS FOR CORRECTING VIBRATIONS OF IMAGES DUE TO VIBRATIONS OF HANDS IN A VIDEO CAMERA

[75] Inventor: Jung-hyun Hwang, Seoul, Rep. of Korea

[73] Assignee: Samsung Electronics Co., Ltd., Kyungki-do, Rep. of Korea

[21] Appl. No.: 641,649

[22] Filed: May 1, 1996

[30]     Foreign Application Priority Data

Aug. 30, 1995 [KR]   Rep. of Korea .................. 1995-27619

[51] Int. Cl.⁶ ...................................................... G02F 1/33
[52] U.S. Cl. ............................................ 359/307; 359/554
[58] Field of Search .................... 359/305, 307, 359/554

[56]             References Cited

U.S. PATENT DOCUMENTS 5,000,549   3/1991   Yamazaki ................................ 350/423
5,523,887   6/1996   Wight ..................................... 359/556

*Primary Examiner*—David C. Nelms
*Assistant Examiner*—Thomas Robbins
*Attorney, Agent, or Firm*—Cushman Darby & Cushman IP Group of Pillsbury Madison & Sutro LLP

[57]                ABSTRACT

An apparatus for minimizing vibration of images in video cameras due to vibration of the operator's hands includes a motion detector, an electric field generator which receives information from the motion detector and generate voltages related to the horizontal and vertical motions, and a hand vibration corrector which uses the voltages from the electric field generator to control the refractive index of a medium through which the incoming video images are passing, to thereby adjust the position of the incoming images. A CCD converts the optical signals of the hand vibration correcting means into electrical signals. The refractive index of the crystal having the electro-optical effect is controlled by electrical signals and the optical source of the input images is optically corrected. Consequently, a high speed response and high precision controlled resolution are provided. Further, the apparatus has a simple structure, and therefore, it can greatly contribute to the camera image stabilization.

10 Claims, 4 Drawing Sheets

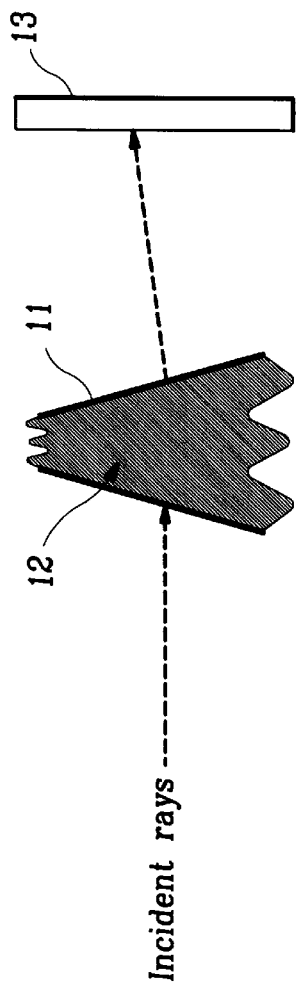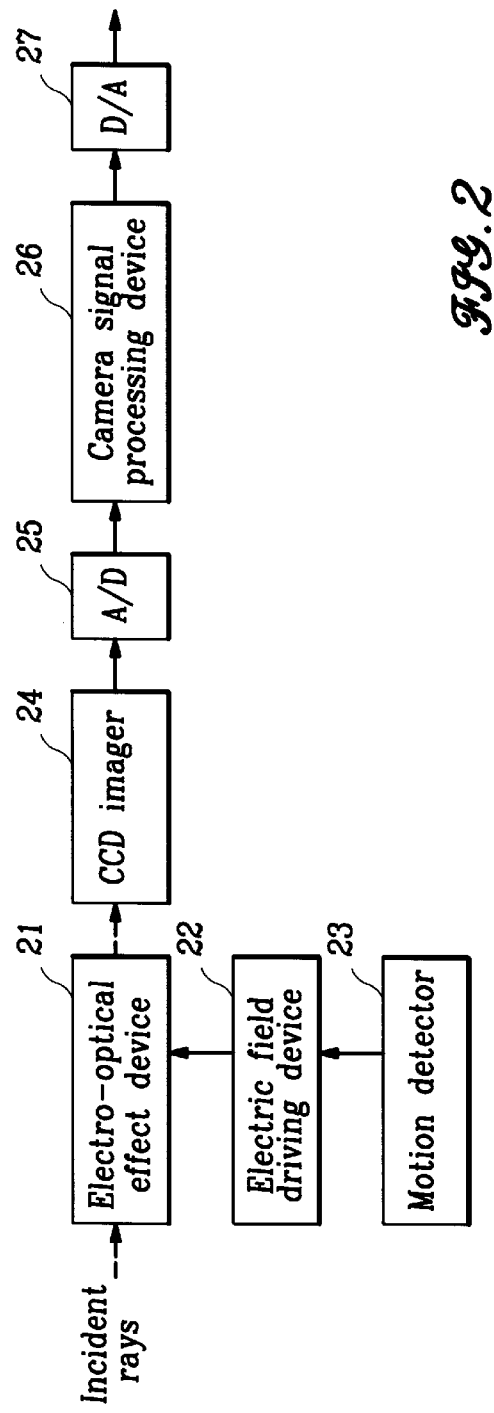

APPARATUS FOR CORRECTING VIBRATIONS OF IMAGES DUE TO VIBRATIONS OF HANDS IN A VIDEO CAMERA

BACKGROUND OF THE INVENTION

1. Field of the Invention

The present invention relates to an apparatus for correcting the vibrations of images due to the vibrations of hands in a video camera, in which the refractive index of a medium is controlled by an electro-optical effect to correct the position of light rays so as to move the images of a zoom lens up and down and to left and right, so that the vibrations of images can be corrected.

2. Description of the Related Art

Detecting moving vectors from signals of an oscillating image is an indispensable technique for picture compression, picture recognition, picture stability, etc.

Photographing with a portable VCR (video cassette recorder) while walking or moving, or with a video camera attached to a moving vehicle, can cause unstable and vibrating images to be generated.

Further, because of miniaturization and greater availability of video cameras, portable video cameras are widely used. However, when photographing with a high ratio lens, instability of images due to vibration from the operator's hands becomes a serious problem.

Video cameras which are currently used have various devices which correct for vibration from the operator's hands. Specifically, in conventional devices, if oscillations of the camera body are detected, recording occurs in a small area instead of over the entire area. In correcting devices of this nature, the input picture is delayed by one field, and the field memory is controlled, or the area to be input is controlled by using a CCD (charge coupled device).

Thus, conventional correcting devices require a CCD or a memory which is larger than the image being filmed, for use as a redundancy area, to prevent picture degradation. Therefore, the bulk of the apparatus becomes large, and the apparatus becomes complicated.

In an attempt to overcome these problems, SONY (Japan) developed a correcting device which directly controls the optical axis of incident light rays with an optical device. One example of this device is shown in FIG. 1, which is a conceptional view showing the principle of this correcting device using an active prism.

Operation of this device will now be explained. First, motion is detected with a gyro sensor, and dislocations of input oscillating images are corrected by using an active prism. The active prism 11 contains fluid 12, so that when incident rays pass through the fluid 12, they are refracted a correct amount before reaching the main CCD 13.

However, in this device, the position and direction of the prism is mechanically controlled, and therefore, there is a limit in the prism driving speed for correcting the vibration of hands and in the controlled resolving power at a high ratio.

SUMMARY OF THE INVENTION

The present invention is intended to overcome the above described disadvantages of the conventional techniques. Therefore it is the object of the present invention to provide an apparatus for correcting image vibrations due to hand vibrations in a video camera, in which the refractive index of a medium having an electro-optical effect is controlled with electrical signals, so that the optical source of the input picture can be optically corrected, thereby providing a high response speed, a high precision controlled resolving power, and a simple structure.

In achieving the above object, the apparatus for correcting image vibrations due to hand vibrations in a video camera according to the present invention includes a motion detector which detects horizontal and vertical motion vectors of the vibrating images due to hand vibrations. An electric field driving device receives the horizontal and vertical motion vectors from the motion detector, and generates voltages related to the horizontal and vertical motions. A hand vibration corrector receives the horizontal and vertical refractive index control voltages from the electric field driving device, controls the refractive index of a medium by utilizing an electro-optical effect, and adjusts the position and direction of the optical signals of the incoming images. And, a CCD converts the optical signals of the hand vibration corrector into electrical signals.

BRIEF DESCRIPTION OF THE DRAWINGS

The preferred embodiments of the present invention will now be described more specifically with reference to the attached drawings, wherein:

FIG. 1 is a conceptional view showing the principle of a conventional hand vibration correcting device using an active prism;

FIG. 2 is a block diagram showing a preferred embodiment of an apparatus for correcting image vibrations due to hand vibrations in a video camera according to the present invention;

DESCRIPTION OF THE PREFERRED EMBODIMENT

Figure 3:
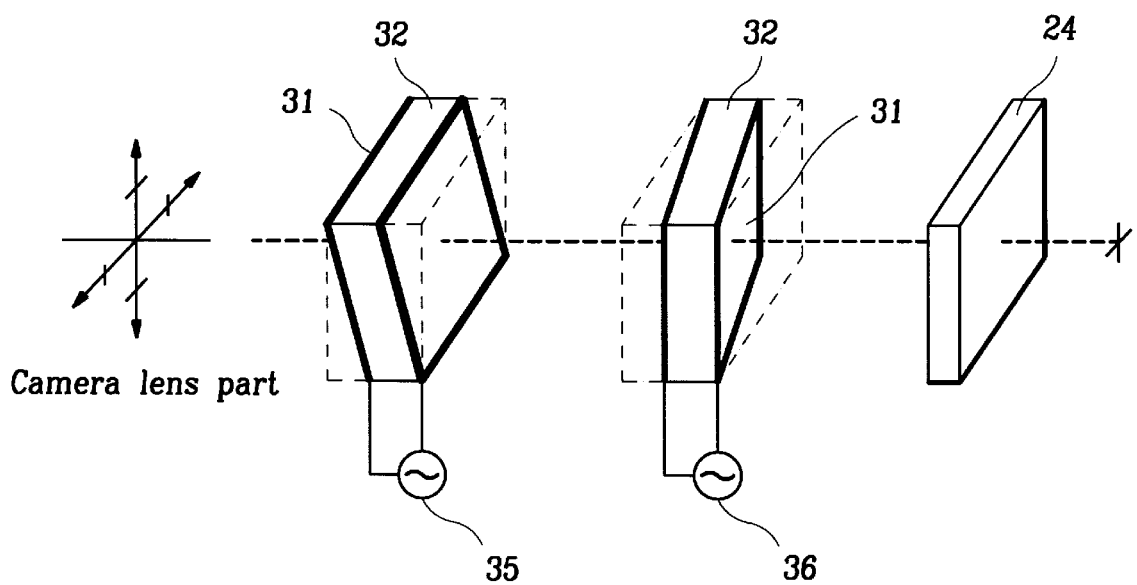
FIG. 3 is a detailed illustration of an electro-optical effect device of the apparatus for correcting image vibrations according to the present invention.

The electro-optical effect which is the basic principle of the present invention will now be described. Electro-optical effect refers to an effect in which the refractive index of a medium is varied in accordance with an applied electric field. A primary electro-optical effect refers to the situation in which the variation of the refractive index in a crystal having no inversion symmetry is proportional to the threshold electric field.

A primary electro-optical effect does not exist in a liquid or a non-crystalline solid or in a crystal having an inversion symmetry. These types of materials may exhibit a secondary electro-optical effect, in which the variation of the refractive index is proportional to the square of the intensity of an electric field.

The electro-optical effect can be expressed by a variant of a refractive index ellipse function varied by an electric field.

In the primary electro-optical effect, the refractive index ellipse function is as follows.

$$(1/n^2)_1 x^2 + (1/n^2)_2 y^2 + (1/n^2)_3 z^2 + 2(1/n^2)_4 (yz)^2 + 2(1/n^2)_5 (zx)^2 + 2(1/n^2)_6 (xy)^2 = 1$$

The increment $\Delta(1/n^2)_i$ of the coefficient $(1/n^2)_i$, (i=1, 2, ... 6) is expressed as follows.

$$\Delta(1/n^2)_i = \sum_{j=1}^{3} r_{ij}E_j (i = 1,2,\ldots 6)$$

In the above formula, $r_{ij}$ (i=1, 2, ... 6; j=1, 2, 3) is called the electro-optical coefficient and E is the electric field.

By considering the symmetry of the crystal, from among the 18 electro-optical coefficients, those coefficients having a value of 0 and like terms may be identified, and the values of the coefficients may be experimentally determined.

Several preferred crystals which exhibit outstanding primary electro-optical effect, include $KH_2PO_4$(KDP), $NH_4H_2PO_4$(ADP), $LiNbO_3$, and $LiTaO_3$.

The electro-optical effect may be utilized to vary the intensity of incident light rays, to deflect incident light rays, and as an optical switch.

The preferred embodiment of the present invention will now be described referring to the attached drawings.

As shown in FIG. 2, the apparatus for correcting image vibrations due to hand vibrations in a video camera according to the present invention includes a motion detector 23 for detecting horizontal and vertical motion vectors of the vibrating images due to hand vibrations.

An electric field driving device 22 receives the horizontal and vertical motion vectors from the motion detector 23, and generates voltages related to the horizontal and vertical motions. These voltages are received by an electro-optical effect device 21 and used to control the refractive index of a medium that is part of the electro-optic effect device 21 by utilizing an electro-optical effect. This enables the position and direction of the optical signals of the incoming images to be adjusted.

A CCD 24 converts the optical signals of the electro-optical effect device 21 into electrical signals and an analogue/digital converter 25 converts the analogue signals of the CCD 24 into digital signals. These digital signals are received by a camera signal processor 26 which converts them into image signals. Signals output from the camera signal processor 26 are then converted into analog signals by a digital/analogue converter 27.

In operation, when power is supplied, the motion detector 23 detects motion vectors of the image, which are caused by the hand vibrations. These motion vectors are preferably detected in advance by a gyro sensor independent of the input video signals.

The electric field driving device 22 receives the motion vectors from the motion detector 23, and generates refractive index control voltages for the horizontal and vertical motions.

The refractive index control voltages are input into the electro-optical effect device 21 which receives the refractive index control voltages through its electrode. The refractive index of the medium of the electro-optical effect device 21 is controlled by the supplied electric field, and the orientation and position incident rays, i.e., the optical signals of the input images, are adjusted.

The optical signals which are controlled in the above described manner are input into the CCD 24 to be converted into electrical signals, and are then converted into digital signals by the analogue/digital converter 25. These digital signals are converted into image signals by the camera signal processing device 26 and then re-converted into analogue signals by the digital/analogue converter 27.

The electro-optical effect device 21 will now be described in more detail. As shown in FIG. 3, the electro-optical effect device 21 includes a crystal 32 disposed between transparent electrodes 31, for exhibiting the electro-optical effect; a vertical motion correcting electric field 35 connected to the two electrodes 31; and a horizontal motion correcting electric field 36 connected to the same electrodes, the structure being symmetrical.

Operation of the electro-optical effect device 21 will now be described.

To correct the unstable images which are input in parallel from the camera lens part, the vertical and horizontal motion correcting electric fields 35 and 36 generate voltages correspondingly to the detected motion vectors.

These voltages are supplied to face electrodes 31, to form electric fields which control the refractive index of the electro-optical effect crystal. Thus the hand-caused image vibrations are optically corrected.

Figure 4A:
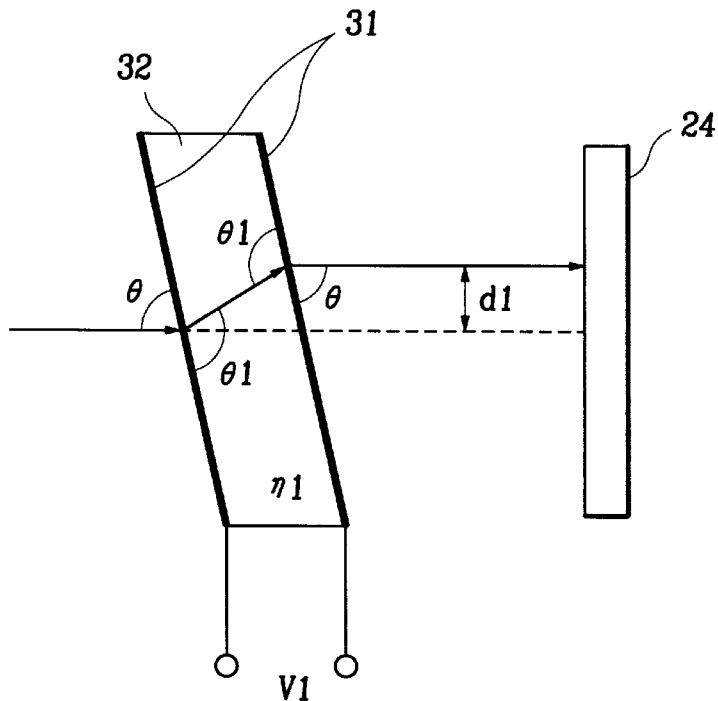
FIGS. 4A and 4B are conceptional views showing the operating principle of the electro-optical effect device of the apparatus for correcting image vibrations according to the present invention.
Figure 4B:
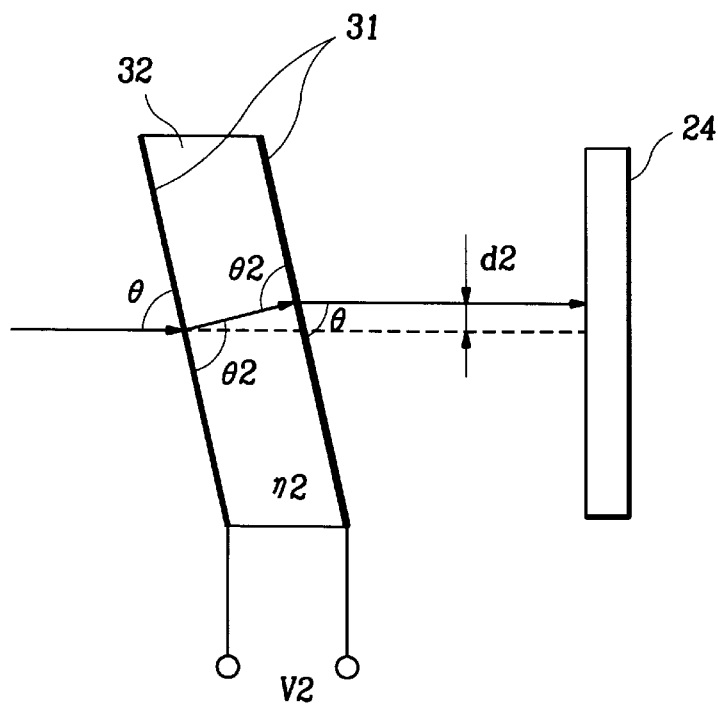

As shown in FIG. 4, a plate-shaped crystal 32 which exhibits an electro-optical effect is formed between a pair of electrodes 31 attached on both faces of the crystal 32. The crystal and electrode combination is inclined at a certain angle θ, so that a variation of the index of refraction will appear in the outgoing rays.

The refractive index η is a function of the voltage V, and therefore, the correcting distance d is controlled by adjusting the refractive index of the electric fields.

Figure 5:
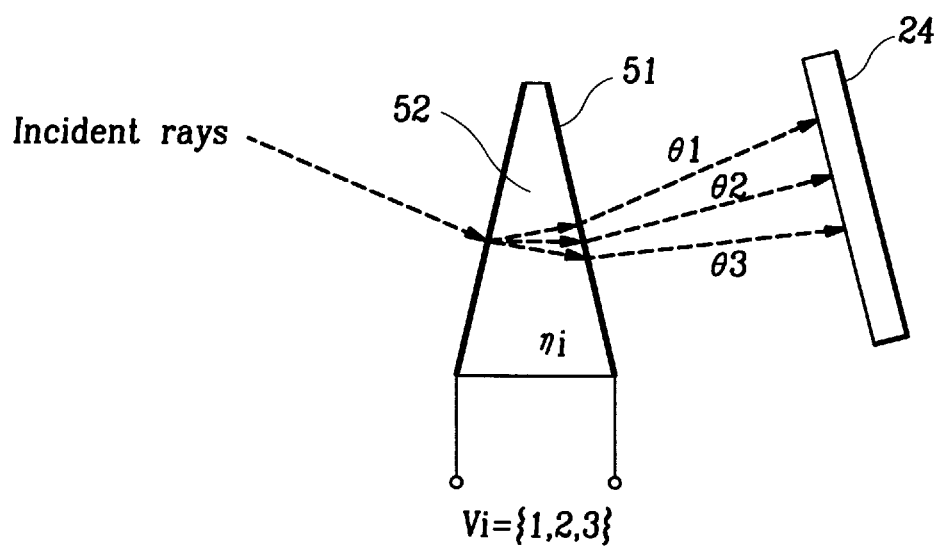
FIG. 5 illustrates the an electro-optical effect device of the present invention in which a prism is used.

Alternatively, a hand-caused image vibration correcting apparatus of a video camera can use a prism as the crystal exhibiting the electro-optical effect for correcting the incident rays. As shown in FIG. 5, in the hand-caused image vibration correcting apparatus having a prism structure, the angle of the refractively passing image is controlled by the electric field supplied to a transparent electrode 51, and the motion vectors are corrected with horizontal and vertical prisms 52.

According to the present invention as described above, the refractive index of the crystal having electro-optical effect are controlled with electrical signals, and the optical source of the input images is optically corrected. Consequently, a high speed response and a high precision controlled resolution are provided. Further, the apparatus has a simple structure, and therefore can greatly contribute to the camera image stabilization.

This application claims priority from Korean Application No. 27619-1995, the content of which is hereby incorporated by reference.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. An apparatus for correcting image vibrations due to vibrations along an image of a video camera by utilizing an electro-optical effect, comprising:

a motion detector for detecting horizontal and vertical motion vectors of vibrating images;

an electric field driving device which receives the horizontal and vertical motion vectors from said motion detector and generates horizontal and vertical refractive index control voltages respectively related to the horizontal and vertical motions;

a vibration corrector, disposed within said video cameras image path, which receives the horizontal and vertical refractive index control voltages from said electric field driving device and controls a refractive index of a medium by utilizing an electro-optical effect to adjust the direction of incoming optical signal images to obtain adjusted optical signal images; and a CCD for converting the adjusted optical signal images into electrical signals.

2. The apparatus as claimed in claim 1, wherein said vibration corrector controls the refractive index of the medium by utilizing the electro-optical effect to correct hand-caused image vibrations.

3. The apparatus as claimed in claim 2, wherein said vibration corrector includes:

transparent electrodes a crystal of said medium exhibiting said electro-optical effect disposed between said transparent electrodes, a vertical motion correcting lead for transmitting a first electrical signal corresponding to a vertical vibratory motion to said transparent electrodes; and a horizontal motion correcting lead for transmitting a second electrical signal corresponding to a horizontal vibratory motion to said transparent electrodes.

4. The apparatus as claimed in claim 1, wherein said vibration corrector includes:

transparent electrodes a crystal of said medium exhibiting said electro-optical effect disposed between said transparent electrodes, a vertical motion correcting lead for transmitting a first electrical signal corresponding to a vertical vibratory motion to said transparent electrodes; and a horizontal motion correcting lead for transmitting a second electrical signal corresponding to a horizontal vibratory motion to said transparent electrodes.

5. The apparatus as claimed in claim 1, wherein said medium is formed in the shape of a prism.

6. The apparatus as claimed in claim 1, wherein said medium is formed in the shape of a plate.

7. The apparatus as claimed in claim 1, wherein said medium functions such that an angle of the refractively passing image is controlled by the electric field supplied to a transparent electrode, and the direction of incoming optical signal images is corrected by horizontal and vertical prisms.

8. A motion correction device, comprising:

a motion detector which detects motion and generates at least one signal corresponding to at least one directional component of said motion; and a motion corrector, disposed along an image path, which receives said signal and controls a refractive index of a medium to adjust an incoming image.

9. The motion correction device of claim 8, wherein said motion corrector includes a electrodes disposed adjacent said medium, such that said refractive index of said medium is adjusted according to a voltage applied across said electrodes.

10. The motion correction device of claim 8, wherein said motion corrector comprises a horizontal motion corrector and a vertical motion corrector, each of said horizontal motion corrector and said vertical motion corrector receiving signals to control a respective horizontal and vertical component of motion by adjusting refractive indexes of respective mediums.

* * * * *